(12) United States Patent
Tourapis et al.

(10) Patent No.: US 8,676,041 B2
(45) Date of Patent: Mar. 18, 2014

(54) SUPPORT OF FULL RESOLUTION GRAPHICS, MENUS, AND SUBTITLES IN FRAME COMPATIBLE 3D DELIVERY

(75) Inventors: Alexandros Tourapis, Milpitas, CA (US); Kevin Stec, Los Angeles, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 270 days.

(21) Appl. No.: 13/376,805

(22) PCT Filed: Jun. 30, 2010

(86) PCT No.: PCT/US2010/040550
§ 371 (c)(1),
(2), (4) Date: Dec. 7, 2011

(87) PCT Pub. No.: WO2011/005625
PCT Pub. Date: Jan. 13, 2011

(65) Prior Publication Data
US 2012/0092449 A1    Apr. 19, 2012

Related U.S. Application Data

(60) Provisional application No. 61/223,027, filed on Jul. 4, 2009, provisional application No. 61/237,150, filed on Aug. 26, 2009.

(51) Int. Cl.
*H04N 5/92* (2006.01)
*H04N 5/89* (2006.01)
*H04N 13/00* (2006.01)
*H04N 15/00* (2006.01)
*H04N 13/04* (2006.01)

(52) U.S. Cl.
USPC ............. 386/335; 386/326; 386/336; 348/42; 348/47; 348/51

(58) Field of Classification Search
USPC ................. 386/326, 335, 336; 348/42, 47, 51
See application file for complete search history.

(56) References Cited

U.S. PATENT DOCUMENTS

| | | | |
|---|---|---|---|
| 8,023,569 B2 * | 9/2011 | Sun | 375/240.26 |
| 2009/0142041 A1 | 6/2009 | Nagasawa | |
| 2009/0220213 A1 | 9/2009 | Ogawa | |
| 2009/0324202 A1 | 12/2009 | Okubo | |
| 2010/0303437 A1 * | 12/2010 | Leichsenring et al. | 386/230 |
| 2011/0013888 A1 * | 1/2011 | Sasaki et al. | 386/353 |

FOREIGN PATENT DOCUMENTS

| | | |
|---|---|---|
| EP | 1628477 | 2/2006 |
| WO | 2007047736 | 4/2007 |
| WO | 2010/151555 | 12/2010 |
| WO | 2011/005624 | 1/2011 |

OTHER PUBLICATIONS

Tourapis, et al., "Format Extensions to the Spatially Interleaved Pictures SEI Message" 30th meeting, Geneva, CH, Jan. 29-Feb. 3, 2009.

* cited by examiner

*Primary Examiner* — Daquan Zhao

(57) ABSTRACT

Full resolution graphic overlays (e.g., graphics, menus, arrows, buttons, captions, banners, picture in picture information) and subtitles in frame compatible 3D delivery for a scalable system are described.

12 Claims, 15 Drawing Sheets

SUPPORT OF FULL RESOLUTION GRAPHICS, MENUS, AND SUBTITLES IN FRAME COMPATIBLE 3D DELIVERY

CROSS REFERENCE TO RELATED APPLICATIONS

This application claims priority to U.S. Patent Provisional Application No. 61/223,027, filed on 4 Jul. 2009, and U.S. Patent Provisional Application No. 61/237,150, filed 26 Aug. 2009, both hereby incorporated by reference in each entireties.

TECHNOLOGY

The present disclosure relates to scalable 3D video applications. More in particular, it relates to a method for embedding subtitles and/or graphic overlays in a scalable 3D video application.

DESCRIPTION OF EXAMPLE EMBODIMENTS

Figure 1:
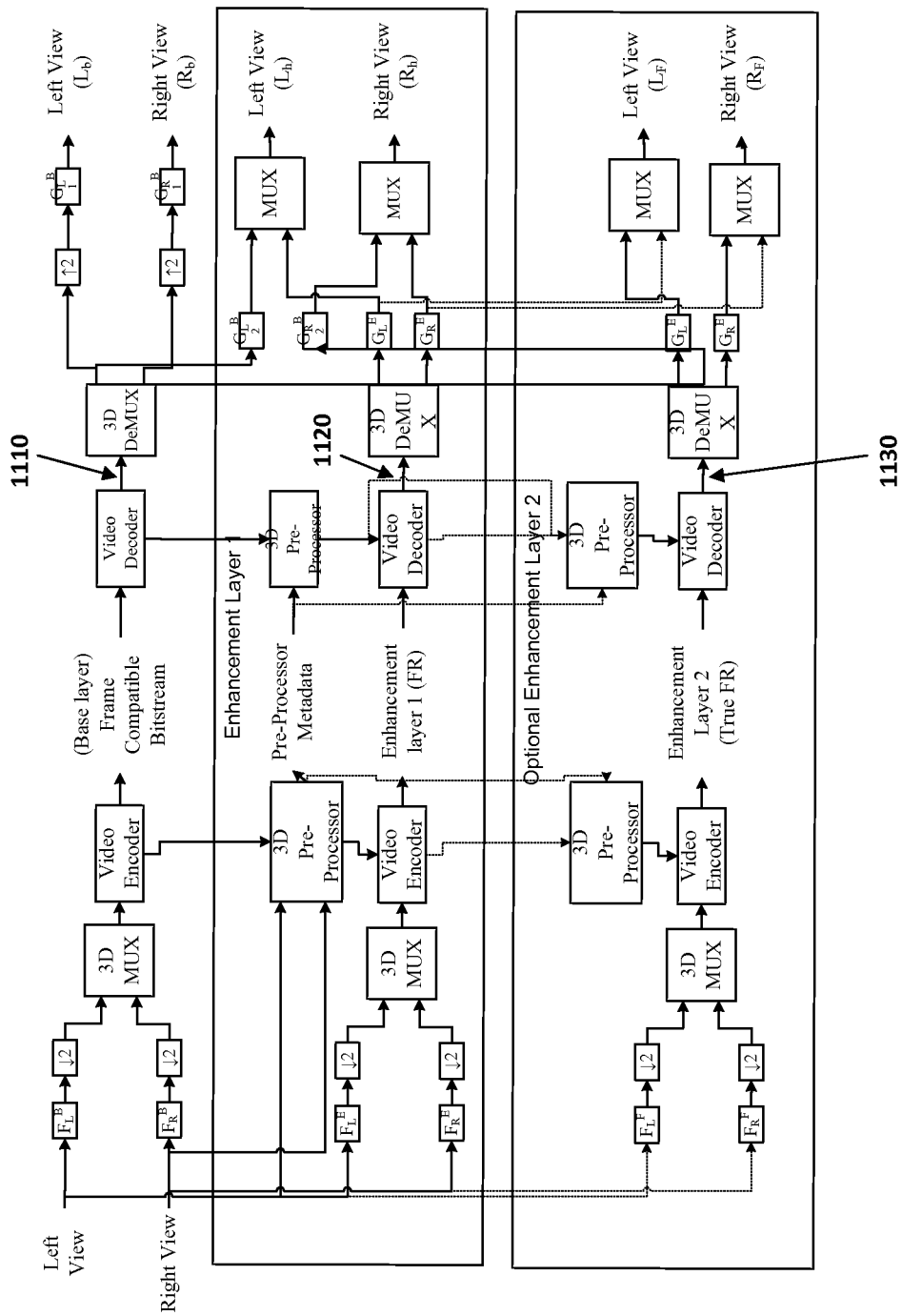
FIG. 1 shows a diagram of a multi-layered 3D coding system.

The present disclosure describes systems and methods supporting full resolution graphic overlays (e.g., graphics, menus, arrows, buttons, captions, banners, picture in picture information) and subtitles in frame compatible 3D delivery for a scalable system.

According to a first aspect, a method for embedding subtitles and/or graphic overlays in a frame compatible 3D video encoding system comprising a base layer and at least one enhancement layer is provided, the method comprising: providing the subtitles and/or graphic overlays separately for the base layer and the at least one enhancement layer.

According to a second aspect, a method for embedding subtitles and/or graphic overlays in a frame compatible 3D video encoding system comprising a plurality of layers and at least one enhancement layer is provided, the method comprising: providing the subtitles and/or graphic overlays separately for each layer, wherein the subtitles and/or graphic overlays provided from some layers are predicted from the subtitles and/or graphic overlays provided by one or more other layers.

According to a third aspect, a system for embedding subtitles and/or graphic overlays in a frame compatible 3D video scalable system comprising a base layer and one or more enhancement layers is provided, the system comprising: a base layer subtitles and/or graphic overlays generator; and one or more enhancement layer subtitles and/or graphic overlays generators for the respective one or more enhancement layers.

According to a fourth aspect, a system for embedding subtitles and/or graphic overlays in a frame compatible 3D video scalable system comprising a base layer and one or more enhancement layers is provided, the system comprising: a base layer subtitles and/or graphic overlays generator; a predictor connected with the base layer subtitles and/or graphic overlays generator, the predictor processing the base layer subtitles and/or graphic overlays and generating enhancement layer subtitles and/or graphic overlays for the one or more enhancement layers.

Scalable systems comprise multiple layers, a base and several (one or more) enhancement layers, where the base layer can enable a first representation of the video signal when decoded. The base layer representation, in this scenario, is based on frame multiplexing of two stereo views, e.g. side by side or over under (frame compatible 3D), and is essentially of half resolution given the sampling process for each stereo view. The additional enhancement layers, if available and decoded, allow for further quality enhancement and essentially of the reconstruction of the full resolution signal for both views. Such systems are described in U.S. Provisional Application No. 61/223,027, filed on Jul. 4, 2009, incorporated herein by reference in its entirety.

The teachings of the present disclosure can be applied to video authoring systems, video encoders and decoders such as Blu-ray players, set-top boxes, software players etc, displays, and encoder/decoder chips. A video authoring system is a tool that allows the editing and creation of a DVD, Blu-ray, or other multimedia storage format, including online multimedia formats. The editing process may include any modifications to the video and audio signals, such as cropping, scaling, creation of different transitions etc, placement of video clips at different time intervals, and creation of menus, graphics, and subtitles in different languages among others.

In accordance with embodiments of the present disclosure, 3D video content can be provided to consumers using a scalable video coding system consisting of multiple layers, such as a base layer and one or more enhancement layers as described in Annex A, which forms part of the specification of the present application. In the base layer 3D video information from two separate, subsampled, views is multiplexed together using a variety of arrangements, such as side by side, line interleaved, or over-under, among others, into a single frame.

Subsampling may have occurred using a variety of sampling methods, such as horizontal, vertical, and quincunx among others. The multiplexed frame in this layer has essentially very similar characteristics to a 2D video frame and can be encoded using conventional methods such as video coding standards and codecs like MPEG-2, MPEG-4 AVC/H.264, and VC-1 among others. This layer can be decoded using single decoder systems without any other hardware assistance, and using appropriate display devices such as micropolarized displays, enable a viewer to experience a 3D movie, even though at a reduced resolution.

Using the enhancement layer or layers, however, of this system, one can enable the reconstruction of the full resolution 3D signal. Essentially, the enhancement layer or layers contain the missing information from the base layer, such as samples or frequency information, that were lost during the creation of the base layer. For efficiency purposes, the enhancement layer or layers use the base, and/or previously encoded enhancement layers, as a predictor since there exists very high correlation between the current enhancement layer samples and other layer samples. The process may include additional mechanisms that can further increase correlation, such as interpolation filters, motion estimation and compensation, and weighted prediction among others. At the decoder, after the reconstruction of the enhancement layer, an additional process that combines that data of the base layer with the data of the enhancement layer or layers is performed in order to reconstruct the full resolution 3D images. The entire process is shown in FIG. 1 of the present application, which is also described in U.S. Provisional Application No. 61/223,027, filed on Jul. 4, 2009, incorporated herein by reference in its entirety. See, in particular, FIG. 11 and related portions of the specification.

Although video information is of the highest importance in this system, other information can also be of high importance and can affect the 3D experience of a user. In particular, it may be desirable to provide to the user graphic overlay and/or subtitle information, including 3D subtitles, or highlight certain content on the video using appropriate graphics information that may be associated with the video. This is especially true if the video content is to be packaged on a media device such as a DVD or Blu-ray disc, or even if delivered over the Internet, a cable, or a satellite system. A user would expect that such functionalities, including the presence and ability to navigate through appropriate 2D and even 3D menus, would be available when using only the base layer or when using all available layers.

Figure 2:
FIG. 2 shows a side by side packing of a video image.
Figure 3:
FIG. 3 shows an over-under packing of a video image.
Figure 4:
FIG. 4 shows a conventional way of embedding subtitles in a side by side packed video image.
Figure 5:
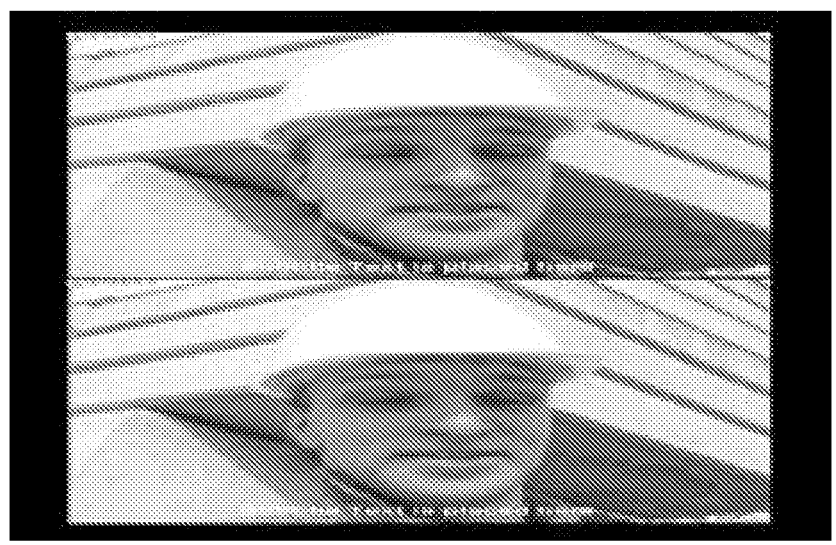
FIG. 5 shows a conventional way of embedding subtitles in an over-under packed video image.
Figure 6:
FIG. 6 shows a conventional way of embedding both subtitles and graphic overlays in a side by side packed video image.
Figure 7:
FIG. 7 shows a conventional way of embedding both subtitles and graphic overlays in a over-under packed video image.

For the base layer, the simplest method of providing such functionalities is to create graphic overlays and/or subtitles while considering the frame packing method, e.g. side by side (see FIGS. 2, 4 and 6) or over-under (see FIGS. 3, 5 and 7), during the authoring process.

According to an embodiment of the present disclosure, the content creator authors the content by considering the 3D video format used, and replicates this information for each segment, where segment here represents the area in the frame that corresponds to a certain view, i.e. the left or right view. These graphics may also be rendered while, optionally, considering depth information allowing further flexibility to the content creator. For example, a different offset in the subtitle text associated with the left segment vs. the subtitle text associated with the right segment creates the illusion to a viewer that the text is at a different depth level versus other information in the video signal. It is in fact possible to assign, by modifying such offsets, different depth to different objects within a scene.

Although this has already been done for frame compatible signals such as side by side (FIGS. 2 and 4) and over under packed (FIGS. 3 and 5) information, it is highly desirable that the same functionality is also retained when the multi-layered system discussed previously and enclosed in Annex A is used, in accordance with embodiments of the present disclosure.

Even though one method of adding such information could be the addition of separate graphics engines after the reconstruction of the full resolution images, this makes the design of the system more expensive and less flexible since it would imply additional subtitle tracks are present within the video, given the desire to preserve the base layer graphics information which is formatted differently, and that additional control and processing is present in the system, making it more expensive to implement such a solution. A different method, which again may be too complex, would be to reprocess the base layer information and extract the graphics for the left and right images separately and add them back to the full resolution images.

Instead, in accordance with the teachings of the present disclosure, a simpler method is presented that enables full resolution reconstruction also of graphics information, without significantly penalizing the design of the system.

In particular, instead of adding the graphics elements directly on the final, reconstructed left and right images, graphics elements are added separately on both the base and enhancement layer information prior to the final view reconstruction process. This implies that graphics are again added on top of these layers according to the packing arrangement used for the video signal. More specifically, if the video signal is generated using the side by side packing arrangement, graphics (e.g. subtitles, captions etc) are created using the same arrangement and added on both the base and enhancement layers separately.

Figure 8:
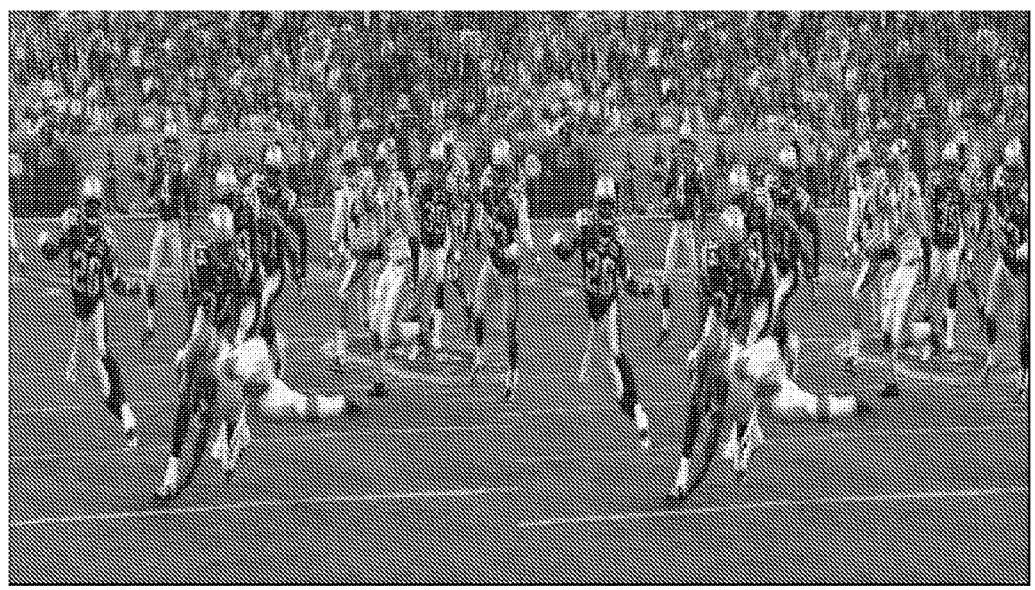
FIG. 8 shows a base layer image of a side by side frame packing arrangement.
Figure 9:
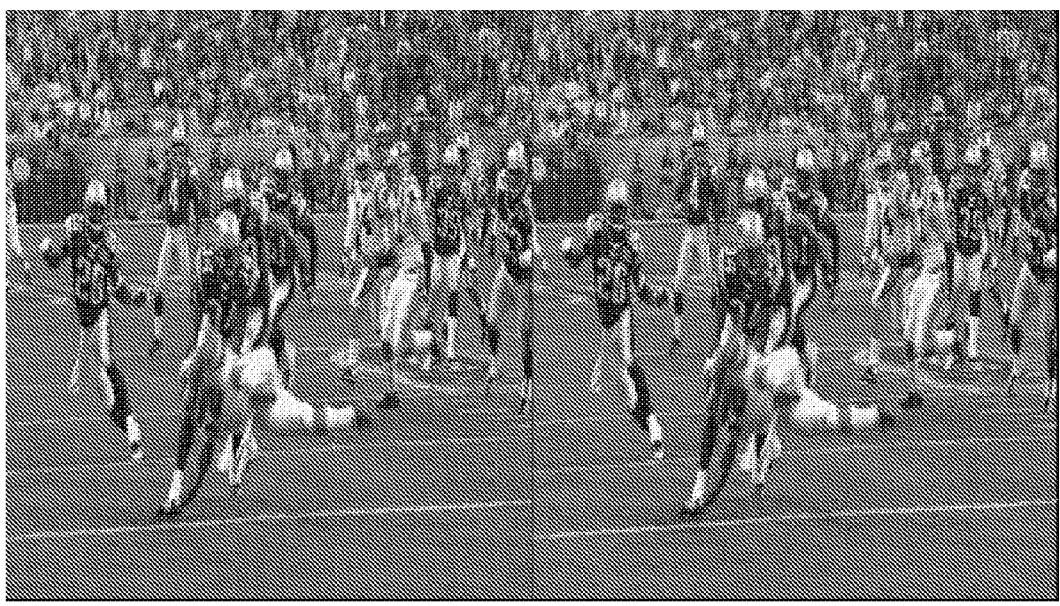
FIG. 9 shows the enhancement layer image of a side by side frame packing arrangement.
Figure 10:
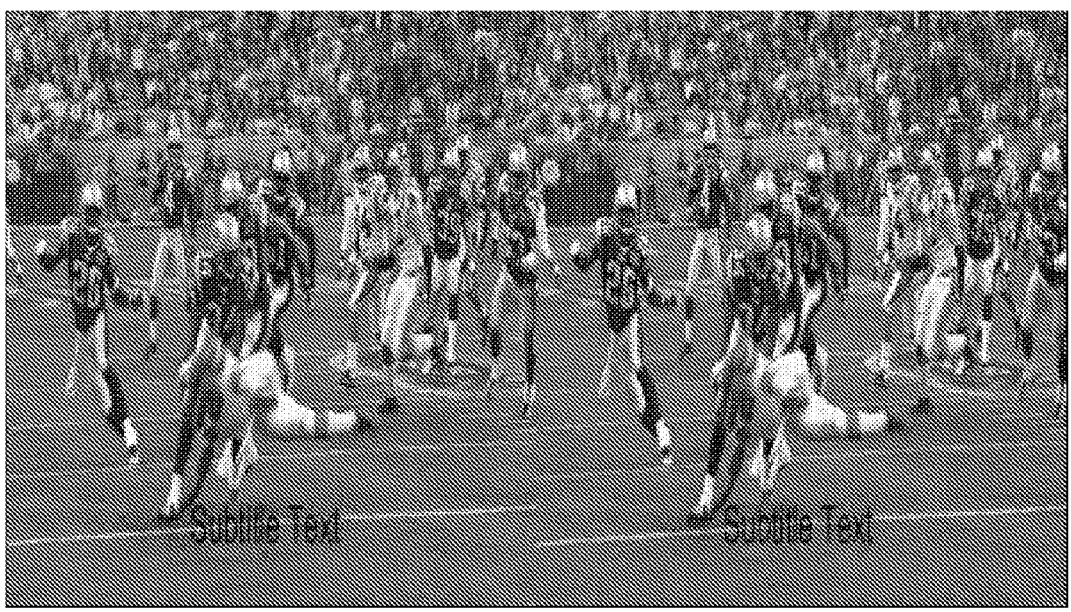
FIG. 10 shows a base layer with subtitles according to an embodiment of the present disclosure.
Figure 11:
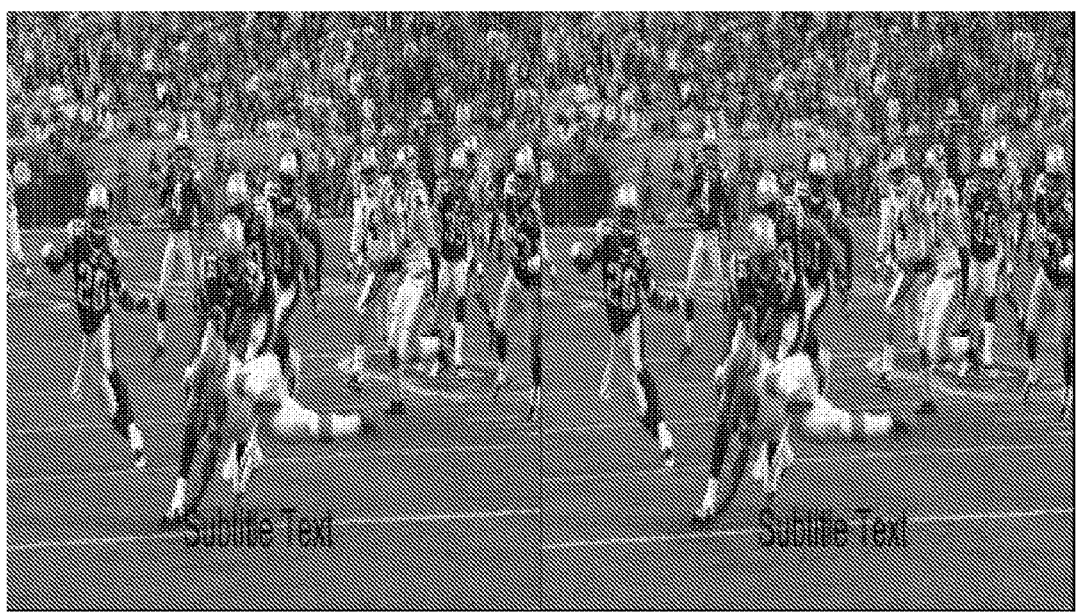
FIG. 11 shows an enhancement layer with subtitles according to an embodiment of the present disclosure.

An example is shown in FIG. 8 for the base layer and FIG. 9 for the enhancement layer. The final separate view images, with the appropriate full resolution graphics (i.e., the graphics generated by combining the base and enhancement layer graphics similar to how the actual images are also synthesized), are synthesized by performing the view reconstruction only after all graphics were added on both images, as also shown in FIG. 10 and FIG. 11.

Figure 12:
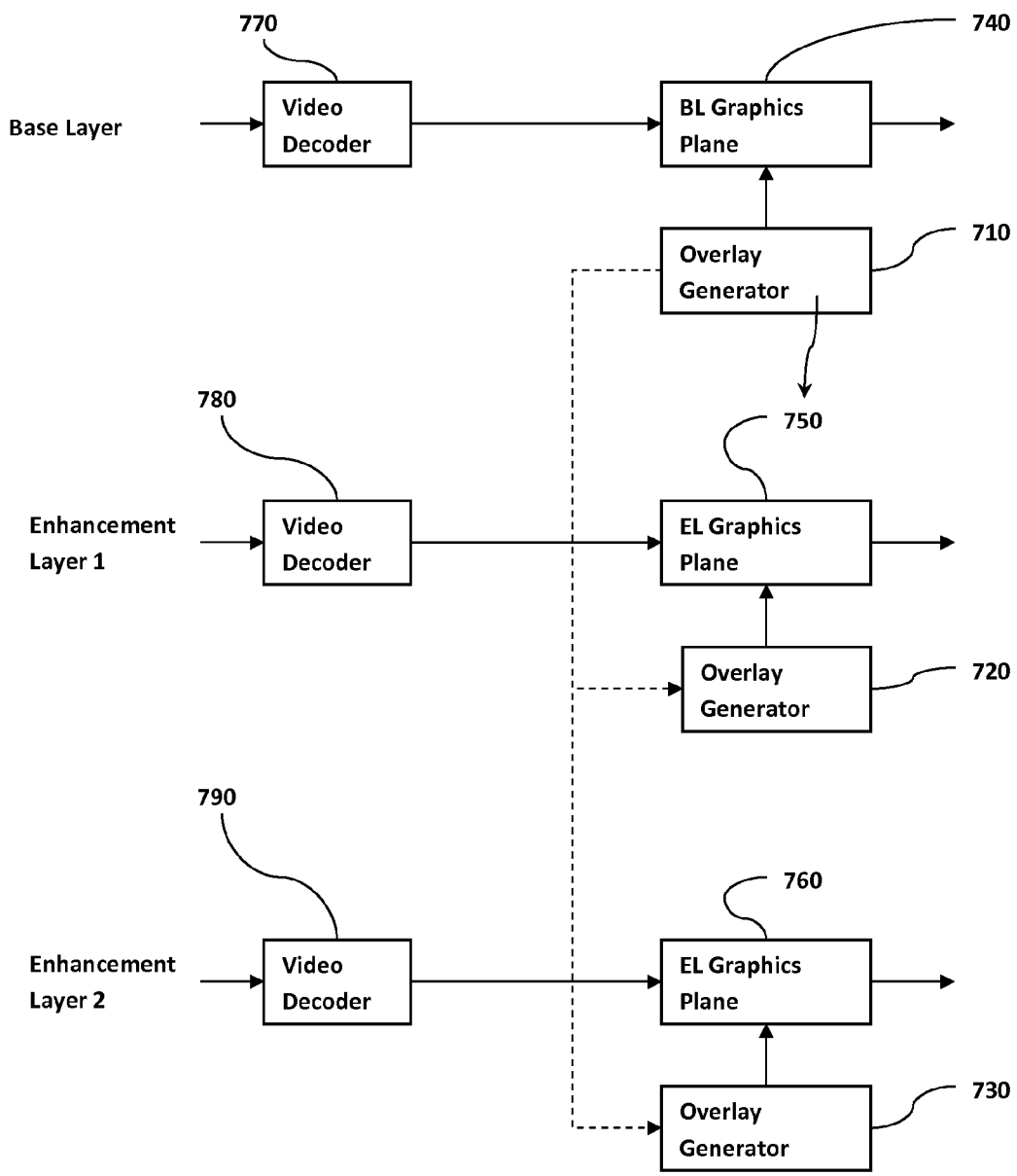
FIG. 12 shows an embodiment of the present disclosure, where support of subtitles and/or graphics overlays in a scalable, full resolution, frame compatible 3D system is shown. Subtitles and/or graphic overlays are added separately, with the appropriate offsets, in each layer and before multiplexing the data into separate, left and right views.
Figure 14:
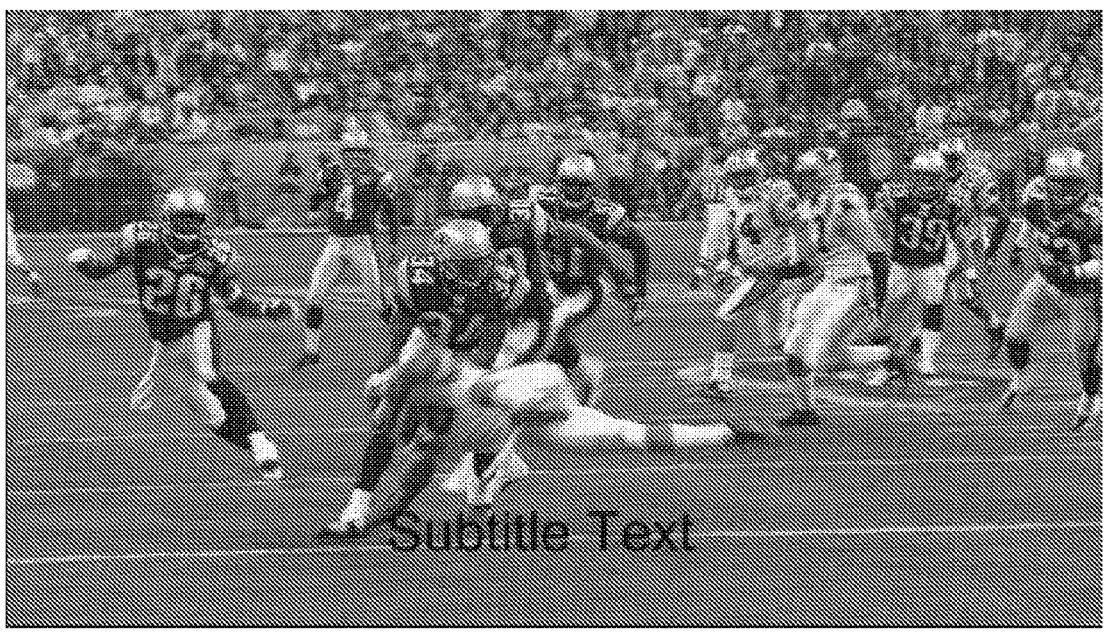
FIG. 14 shows the final left view with subtitle text (after remixing).
Figure 15:
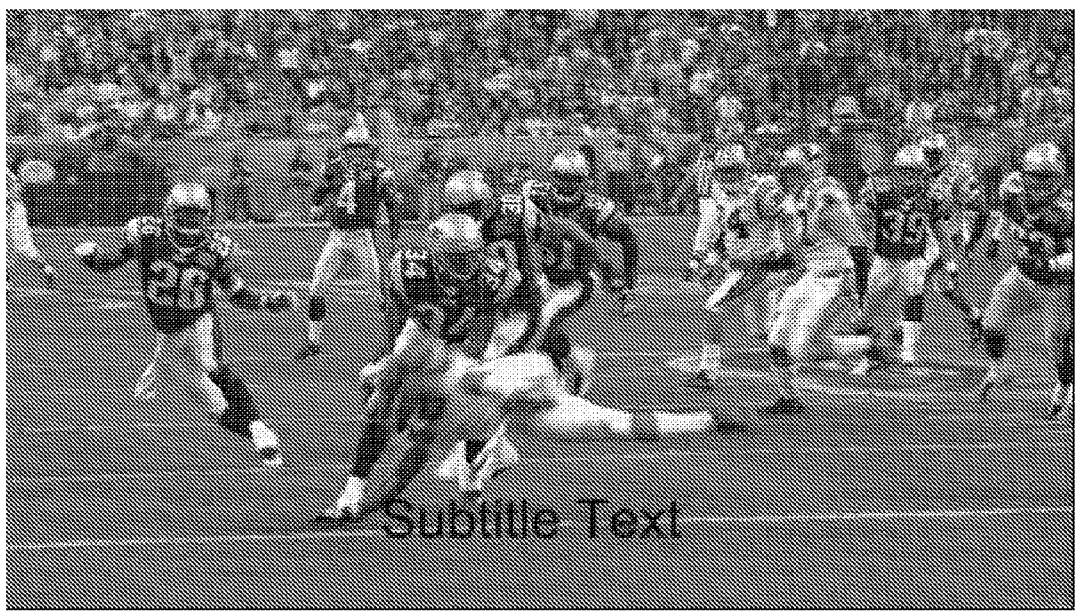
FIG. 15 shows the final right view with subtitle text (after remixing).

The system and method according to the present disclosure are shown in FIG. 12 where after the base or enhancement layer is decoded, the appropriate graphics (e.g., interactive graphics IG and/or presentation graphics PG) are also created and added on top of the video data. Then, the new video data, with the overlayed graphics, are multiplexed together to generate the final, separate, 3D images, as is also shown in FIG. 14 and FIG. 15.

Turning to the description of FIG. 12, it should be noted that the overlay generators (710), (720), (730) can be provided at locations (1110), (1120), (1130), respectively, of the system shown in FIG. 1. In particular, as shown in FIG. 12, overlay generators (710), (720), (730) act on graphic planes (740), (750), (760), respectively, at the output of video decoders (770), (780) and (790). Therefore, in accordance with embodiments of the present disclosure, subtitles and/or graphic overlays are provided separately for each of the base layer and at least one enhancement layer.

Moreover, according to a further embodiment of the present disclosure, generation of subtitles and/or overlay graphics for the enhancement layer or layers can be provided by interpolating the base layer data, as also noted later in the present disclosure.

According to embodiments of the present disclosure, the different sampling performed for the base vs. the enhancement layer is also taken into account. In particular, for the base layer and for side by side packing, the left view may have been sampled by skipping every other horizontal pixel starting from column 0, while the right view may have been sampled by skipping every other horizontal pixel starting from column −1. On the other hand, sampling for the enhancement layer is reversed, i.e. sampling starting from column −1 for the left view and column 0 for the right view. Given these characteristics of the base and enhancement layers it would be desirable that graphics are also sampled using exactly the same method.

Additionally, in some systems, sampling of subtitles and/or graphic overlays can be done by disabling anti-aliasing and/or filtering to allow the subtitles and/or graphic overlays to be sampled using the same sampling method for the base and enhancement layers, which will ensure that the full resolution reconstruction of the graphics has not lost any information.

In a different embodiment, it could be possible that the enhancement layer graphics data are predicted or reconstructed, in a similar way to the video data, from those of the base layer. In particular, instead of having to send the information multiple times, in both base and enhancement, the data may only be present in the base layer. However, both base and enhancement layer graphics units or overlay generators (710), (720), (730) of FIG. 12 can use the same data to generate or synthesize the graphics overlay information, such as subtitle text, without having to perform any additional rendering. The base and synthesized enhancement layer graphics overlays are then added to the base and enhancement video layers respectively.

In a separate embodiment the enhancement layer unit or units (720), (730) may perform additional processing, e.g. different filtering or interpolation/sampling, to generate the graphics using a different sampling of those of the base layer, without having to render the graphics overlay separately. For example, the enhancement layer graphics overlay may be generated by simply copying the data from the base layer or by interpolating the base layer data using a horizontal interpolation filter such as the H.264 six tap interpolation filter, bilinear interpolation, bicubic or lanczos interpolation.

Figure 13:
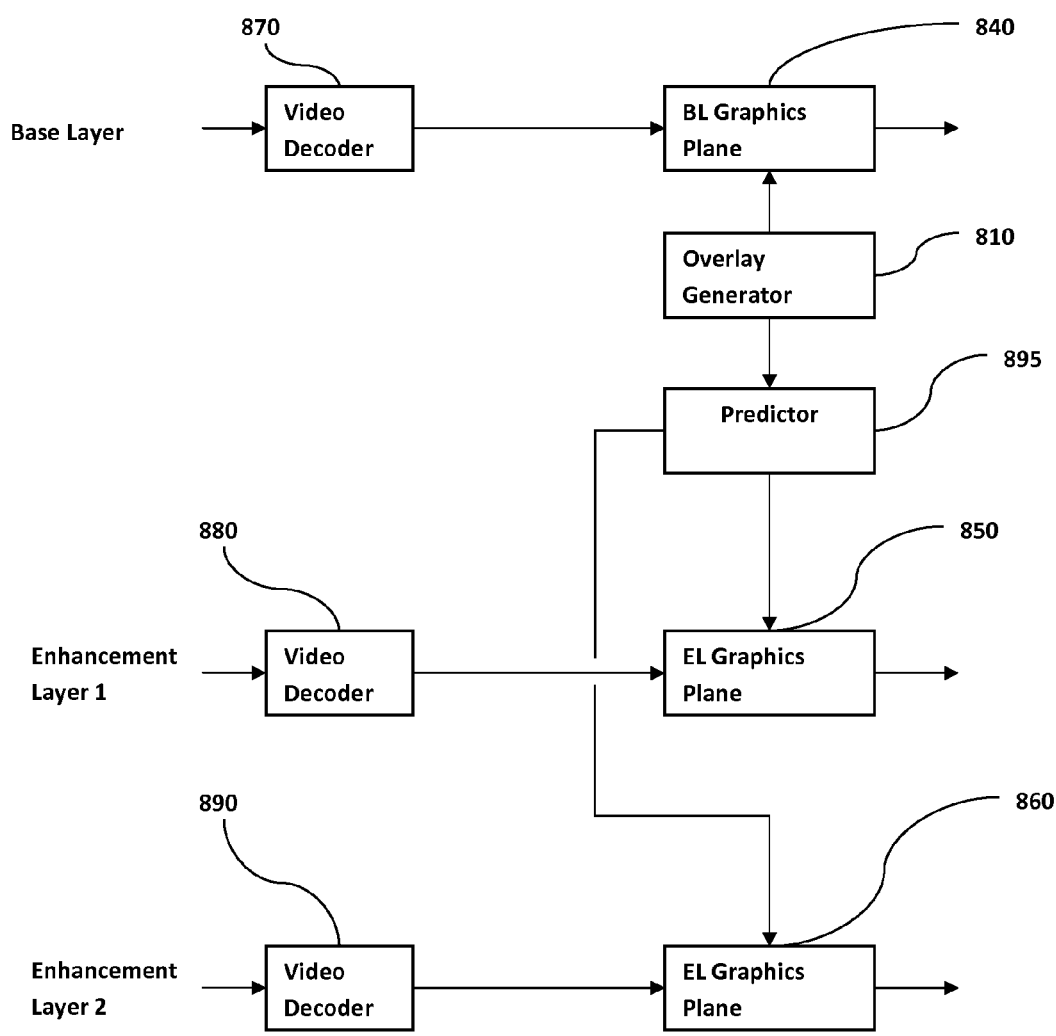
FIG. 13 shows a further embodiment of the present disclosure, where overlay generation for the one or more enhancement layers is provided by a prediction module associated with the base layer overlay generator.

A further embodiment of the present disclosure is shown in FIG. 13, where a predictor module (895) connected with a base layer overlay generator (810) is shown, and where the predictor module (895) operates as an overlay generator for the one or more enhancement layers. If desired, the predictor module (895) can perform interpolation of the base layer data and provide the interpolated data to the enhancement layers.

According to a further embodiment, in the case of a system having multiple layers, prediction can be done from a certain layer or layers. In other words, N layers are generated, M layers are predicted. This can be especially true for the case of multiview coding.

The graphics that could be added may include subtitle information, captions, buttons, arrows, and other graphics, but could also include textures and/or images. These graphics could be stationary or moving, 2D and 3D. In a special case, this may involve the addition of a Picture-in-Picture signal where the decoder may wish to overlay a different program on top of a 3D video. In this case, this video would have to be rendered properly on both left and right views. This implies that for the base layer, the signal would have to be sampled appropriately (i.e. using the same sampling that was used to generate the base layer for the video) and rendered on both the left and right subimages of the used frame packing arrangement, and should be overlayed on top of both base and enhancement layers.

Apart from the decoder, embodiments of the present disclosure provide for an authoring and encoding method and system which allows the creation of such appropriate graphics information as discussed in previous sections. Such authoring method and system may have the purpose of creating and authoring disc storage media such as a Blu-ray disc, or for other distribution systems such as broadcast, satellite, and/or the Internet.

The teachings of the present disclosure also apply to multiview cases, where more than two views for a scene are available.

The methods and systems described in the present disclosure may be implemented in hardware, software, firmware or combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

The examples set forth above are provided to give those of ordinary skill in the art a complete disclosure and description of how to make and use the embodiments of the method for support of full resolution graphics, menus and subtitles in frame compatible 3D delivery of the disclosure, and are not intended to limit the scope of what the inventors regard as their disclosure. Modifications of the above-described modes for carrying out the disclosure may be used by persons of skill in the video art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

The invention claimed is:
1. A method for embedding subtitles and/or graphic overlays in a frame compatible 3D video encoding system comprising a 3D base layer and at least one 3D enhancement layer, the method comprising:

providing video content associated with the subtitles and/or graphic overlays separately for the 3D base layer and the at least one 3D enhancement layer;

embedding the subtitles and/or graphic overlays separately for the 3D base layer and the at least one 3D enhancement layer to the video content, wherein the subtitles and/or graphic overlays provided for the at least one 3D enhancement layer are copies of the subtitles and/or graphic overlays provided for the 3D base layer or interpolated from the subtitles and/or graphic overlays provided for the 3D base layer, and wherein the subtitles and/or graphic overlays for the 3D base layer and the at least one 3D enhancement layer are at a lower resolution; and combining, subsequent to the embedding, the 3D base layer and the at least one 3D enhancement layer to form the video content and the subtitles and/or graphic overlays at a higher resolution than the 3D base layer resolution, wherein the subtitles and/or graphic overlays are embedded in the video content.

2. The method of claim 1, wherein the subtitles and/or graphic overlays comprise depth information.

3. The method of claim 1, wherein the 3D base layer is sampled according to a first sampling method and the at least one 3D enhancement layer is sampled according to a second sampling method, the method further comprising:

sampling the subtitles and/or graphic overlays for the 3D base layer according to the first sampling method; and sampling the subtitles and/or graphic overlays for the at least one 3D enhancement layer according to the second sampling method, wherein the second sampling method obtains samples not obtained by the first sampling method.

4. The method of claim 1, wherein the subtitles and/or graphic overlays are provided independently for each layer.

5. The method of claim 1, wherein:

each layer comprises at least a first view and a second view at the lower resolution, the embedding the subtitles and/or graphic overlays separately is for the first view and the second view at each layer, and the combining forms the first view, the second view, and the subtitles and/or graphic overlays on the first view and the second view at the higher resolution.

6. An authoring method comprising the method of claim 1.

7. A system for embedding subtitles and/or graphic overlays in a frame compatible 3D video scalable system comprising a 3D base layer and one or more 3D enhancement layers, the 3D base layer and the at least one 3D enhancement layer comprising video content associated with the subtitles and/or graphic overlays, the system comprising:

a base layer subtitles and/or graphic overlays generator to provide base layer subtitles and/or graphic overlays at a lower resolution to the video content for the 3D base layer;

one or more enhancement layer subtitles and/or graphic overlays generators for the respective one or more enhancement layers, wherein each enhancement layer subtitles and/or graphic overlays generator provides enhancement layer subtitles and/or graphic overlays at a lower resolution to the video content for the at least one 3D enhancement layer; and one or more combiners configured to combine the 3D base layer and the one or more 3D enhancement layers to form the video content and the subtitles and/or graphic overlays at a higher resolution than the 3D base layer resolution, wherein the subtitles and/or graphic overlays are embedded in the video content, wherein subtitles and/or graphic overlays from the one or more enhancement layer subtitles and/or graphic overlays generators are copies of the subtitles and/or graphic overlays provided for the 3D base layer or interpolated from the subtitles and/or graphic overlays from the base layer subtitles and/or graphic overlays generator.

8. The system of claim 7, wherein the 3D base layer comprises a base layer video decoder and the one or more 3D enhancement layers comprise respective enhancement layer video decoders and wherein:

the base layer subtitles and/or graphic overlays generator operates on a base layer graphics plane at the output of the base layer video decoder, and each enhancement layer subtitles and/or graphic overlays generator for the one or more enhancement layers operates on an enhancement layer graphics plane at the output of a respective enhancement layer video decoder.

9. The system of claim 7, wherein the subtitles and/or graphic overlays comprise depth information.

10. The system of claim 7, wherein samples provided by the one or more enhancement layer subtitles and/or graphic overlays generators are different from samples provided by the base layer subtitles and/or graphic overlays generator.

11. The system of claim 7, wherein:

each of the base layer and the one or more enhancement layers comprises at least a first view and a second view at the lower resolution, and the one or more combiners are configured to combine the base layer and the one or more enhancement layers to form the first view, the second view, and the subtitles and/or graphic overlays on the first view and the second view at the higher resolution.

12. A method for embedding subtitles and/or graphic overlays in a frame compatible 3D video encoding system comprising a 3D base layer and at least one 3D enhancement layer, the method comprising:

providing video content associated with the subtitles and/or graphic overlays separately for the 3D base layer and the at least one 3D enhancement layer, wherein the 3D base layer is sampled according to a first sampling method and the at least one 3D enhancement layer is sampled according to a second sampling method, the method further comprising:

sampling the subtitles and/or graphic overlays for the 3D base layer according to the first sampling method; and sampling the subtitles and/or graphic overlays for the at least one 3D enhancement layer according to the second sampling method, wherein the second sampling method obtains samples not obtained by the first sampling method;

embedding the subtitles and/or graphic overlays separately for the 3D base layer and the at least one 3D enhancement layer to the video content, wherein the subtitles and/or graphic overlays provided for the at least one 3D enhancement layer are copies of the subtitles and/or graphic overlays provided for the 3D base layer or interpolated from the subtitles and/or graphic overlays provided for the 3D base layer, and wherein the subtitles and/or graphic overlays for the 3D base layer and the at least one 3D enhancement layer are at a lower resolution; and combining, subsequent to the embedding, the 3D base layer and the at least one 3D enhancement layer to form the video content and the subtitles and/or graphic overlays at a higher resolution than the 3D base layer resolution, wherein the subtitles and/or graphic overlays are embedded in the video content.

* * * * *